(12) United States Patent
Felder et al.

(10) Patent No.: US 7,824,142 B2
(45) Date of Patent: Nov. 2, 2010

(54) FASTENING ELEMENT

(75) Inventors: Gerald Felder, Feldkirch (AT); Carmen Bier, Lauda-Koenigshofen (DE)

(73) Assignee: Hilti Aktiengesellschaft, Schaan (LI)

( * ) Notice: Subject to any disclaimer, the term of this patent is extended or adjusted under 35 U.S.C. 154(b) by 225 days.

(21) Appl. No.: 12/231,671

(22) Filed: Sep. 3, 2008

(65) Prior Publication Data

US 2009/0060678 A1 Mar. 5, 2009

(30) Foreign Application Priority Data

Sep. 5, 2007  (DE) .................... 10 2007 000 485

(51) Int. Cl.
*F16B 35/04* (2006.01)
(52) U.S. Cl. .................... 411/424; 411/487; 411/914; 411/901; 470/17

(58) Field of Classification Search ........... 411/424, 411/411, 901, 902, 487, 914; 470/17
See application file for complete search history.

(56) References Cited

U.S. PATENT DOCUMENTS

| 3,884,116 | A | * | 5/1975 | Hage ........................ 428/592 |
| 4,802,807 | A | * | 2/1989 | Offenburger et al. ..... 411/387.1 |
| 5,417,776 | A | * | 5/1995 | Yoshino et al. ............ 148/318 |

* cited by examiner

*Primary Examiner*—Gary Estremsky
(74) *Attorney, Agent, or Firm*—Abelman, Frayne & Schwab

(57) ABSTRACT

A fastening element has a core zone (14) formed of a relatively hard carbon steel, a skin zone (17) located outwardly of the core zone (14) and formed of a first low-carbon austenitic steel alloyed with a first alloy metal, and an intermediate zone (15a, 15b) provided between the core zone (14) and the skin zone (17) and formed of a second low-carbon steel having a smaller hardness than the steel the core zone (14) is formed of.

12 Claims, 1 Drawing Sheet

FASTENING ELEMENT

BACKGROUND OF THE INVENTION

1. Field of the Invention

The present invention relates to a fastening element having a core zone formed of a relatively hard carbon steel and a skin zone located outwardly of the core zone and formed of a low-carbon austenitic steel alloyed with a first alloy metal.

2. Description of the Prior Art

The fastening element of the type described above such as, e.g., nails, bolts, screws, anchors, and the like are formed of steel, in particular of a high-strength steel, and are used in an attachment technology for securing objects to hard receiving materials such as concrete, metal, stone or for connecting the objects with each other. The fastening elements have a shaft with, if needed, a pointed end and, if needed, a head provided at the opposite end and having an increased, in comparison with the shaft, diameter. The driving of the fastening element or the attachment process is carried out, e.g., by applying blows to the fastening element, e.g., with a combustion operated power tool, or by rotating the fastening element, e.g., with a screwdriving power tool, or in any other suitable manner.

The conventionally used high-strength steels combine high tensile strength with high yield points (at about more than 800 MPa). As a result, fastening elements, which have a reduced cross-section and, at the same time, a high strength, can be produced. A high-strength steel, however, does not tolerate a corrosive action well. The basis for this is a high predisposition of the high-strength steels to brittle fractures which are caused by stress corrosion when steel is subjected to chemical or electrochemical processes in its regions adjacent to the outer surface. Here, the atomized hydrogen forms an essential component. Hydrogen embrittlement (hydrogen-induced crack formation) takes place primarily in high-strength hardened steels with a tensile strength of about more than 800 MPa. Generally, one distinguishes between a primary hydrogen embrittlement that can take place at a galvanic zinc plating and so-called secondary embrittlement which is also referred to as a corrosion-induced hydrogen embrittlement. Critical parameters here are latent stresses (tensile stresses) which are a result of the high hardness and, e.g., of local inhomogeneity, in materials with a particular structure (martensitic, bainitic, etc.) outside tensile stresses, environmental conditions, and the time factor.

The primary hydrogen embrittlement is treated, as a rube, by heat treatment, a so-called debrittlement. In conclusion of a galvanic refining process, the parts are held at a temperature of about 200° C. for many hours. Part of the hydrogen, which is contained in the steel material, is released, so that the content of hydrogen is decreased below the critical threshold for the fastening element or is distributed to a large extent.

The secondary (corrosion-induced) hydrogen embrittlement occurs in high-strength fastening elements, as a rule, when a fastening element has already undergone a corrosion attack. A typical example of it is the stress corrosion of, e.g., high-strength, galvanically zinc-plated screws and nails used outside in open air. Because this type of the stress corrosion can occur only after a certain "incubation period," this phenomenon in, e.g., screws and nails became also known as a delayed fracture failure. Therefore, such fastening elements should be used in dry interior spaces and are not suitable for outside use. German Patent DE 38 04 824 C2 discloses a workpiece, which is formed, e.g., as a drilling screw and has a large hardness. The workpiece has a hard core zone formed of a martensitic chrome steel, and an austenitic skin zone formed of chrome, nickel and iron in different combination and having a smaller hardness. In order to obtain this skin zone, the workpiece, which is formed of the chrome steel, is provided with a coating of an alloy containing essentially nickel and cobalt. By a subsequent heat treatment at least 800° C. in an oxygen-free atmosphere and a subsequent diffusion, and austenitic skin zone is produced, and the available hydrogen is expelled. In the produced workpiece, the hydrogen embrittlement should be prevented, and a high corrosion resistance is achieved.

The drawback of these workpieces consists in that the stainless chrome steel is relatively expensive.

An object of the present invention is to eliminate the drawback of the known workpiece and to produce a fastening element having a high resistance against the hydrogen embrittlement and that can be cost-effectively produced.

SUMMARY OF THE INVENTION

This and other objects of the present invention, which will become apparent hereinafter, are achieved by providing a fastening element having, in addition to the skin zone which is formed of a first low-carbon austenitic steel with a first alloy metal, a first intermediate zone provided between the core zone and the skin zone and formed of a second low-carbon steel having a smaller hardness than the steel the core zone is formed of. The steel of the core zone is preferably a martensitic or bainitic steel. By providing an intermediate zone formed of a second low-carbon steel that has a different metallurgical composition than the low-carbon steel of the skin zone, there is produced a fastening element having a high resistance against the secondary hydrogen embrittlement and that can be economically produced. The use of the chrome steel can, therefore, be dispensed with.

Advantageously, the second low-carbon steel of the first intermediate zone is an austenitic steel alloyed with a second alloy metal. This austenitic steel can also include a portion of the first alloy metal. However, the concentration of the second alloy metal in the austenitic steel of the intermediate zone is noticeably greater than the concentration of the first allow metal. In addition to the advantage of a high resistance against penetration of hydrogen due to a double filtration effect, the characteristics of a fastening element such as, e.g., change of hardness in accordance with distribution of the latent stress in the fastening element, can be optimally obtained by forming differently alloyed skin zone and intermediate zone.

It is advantageous when the second low-carbon steel of the intermediate zone is a ferritic steel. Thereby, the toughness of the fastening element is noticeably increased and, simultaneously, the latent stress distribution in the skin zone (intermediate zone and skin zone) is favorably influenced.

It is further advantageous when a second intermediate zone, which is formed of a relatively hard carbon steel, is provided between the first intermediate zone, which is formed of a ferritic steel and the skin zone. Thereby, a less expensive manufacturing of a fastening element is insured. The second intermediate zone can have e.g., a martensitic structure.

Advantageously, the first intermediate zone has a thickness transverse to a surface of the core zone in a range between 0.001 mm and 1 mm. Thereby, on one hand, an adequate barrier against the hydrogen embrittlement is produced and, on the other hand, the costs of producing this zone are held low due to a relatively short austenitization process.

Advantageously, the first intermediate zone, which is formed of the ferritic steel, has thickness transverse to a surface of the core zone in a range between 0.01 mm and 0.2 mm. Thereby, on one hand, an adequate barrier against the hydrogen embrittlement is produced and, on the other hand, the costs of producing this zone are held low due to a relatively short decarburization process.

Advantageously, the second intermediate zone has a thickness transverse to a surface of the core zone in a range between 0.002 mm and 0.3 mm.

Advantageously, the first alloy metal of the steel of the skin zone is a metal selected from the group containing Ni, Mn, Co, Al, Cr, V, and Mo. Thereby, optimal metallurgical characteristics of the austenitic steel of the skin zone can be obtained. The first metal alloy can be an alloy by itself or a mixture with one or more of the above-mentioned metals.

Advantageously, the second alloy metal of the steel of the first intermediate zone is also a metal selected from the group containing Ni, Mn, Co, Al, Cr, V, and Mo. Thereby, optimal metallurgical characteristics of the austenitic steel of the first intermediate zone can be obtained. The second alloy metal is not identical to the first alloy metal. The second metal alloy can be an alloy by itself or a mixture with one or more of the above-mentioned metals.

Advantageously, the share of the second alloy metal in the steel of the first intermediate zone gradually changes from outside in. In particular, the share of the second alloy metal gradually decreases from outside in. Further, advantageously, the share of the first alloy metal in the steel of the skin zone also gradually changes from outside in. In particular, the share of the first alloy metal decreases gradually from outside in. Thereby, a continuing course of the characteristics of the skin zone and the intermediate zone is insured.

It is advantageous when a coating of a corrosion-resistant material is provided over the skin zone. The coating layer can, e.g., be applied, e.g., in form of a metal layer of one of the following metal Zn, Sn, Co, or Al which, e.g., is galvanically applied to the outer surface of the skin zone. With a corrosion protection layer which, advantageously, completely envelopes the fastening element, a high corrosion resistance of the fastening element is achieved.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
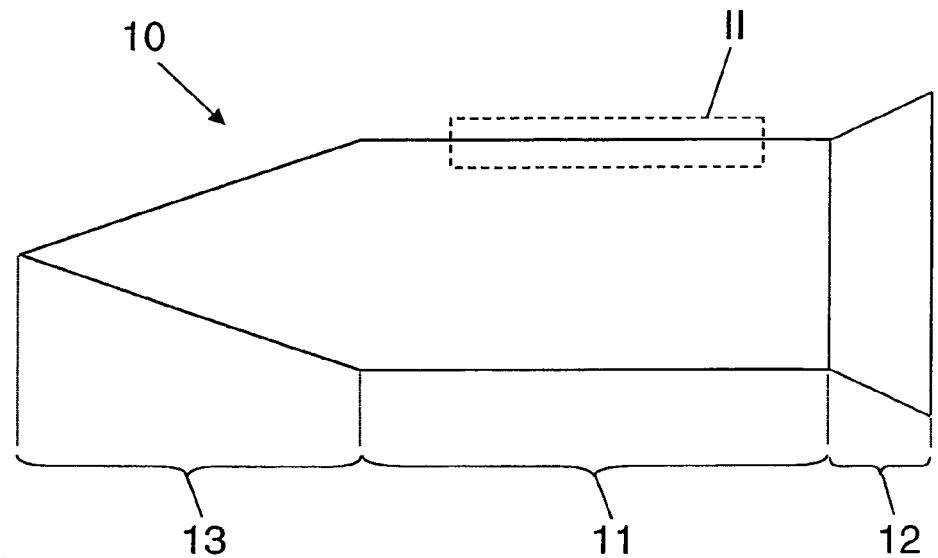
FIG. 1 a plan view of a first embodiment of a fastening element according to the present invention.
Figure 2:
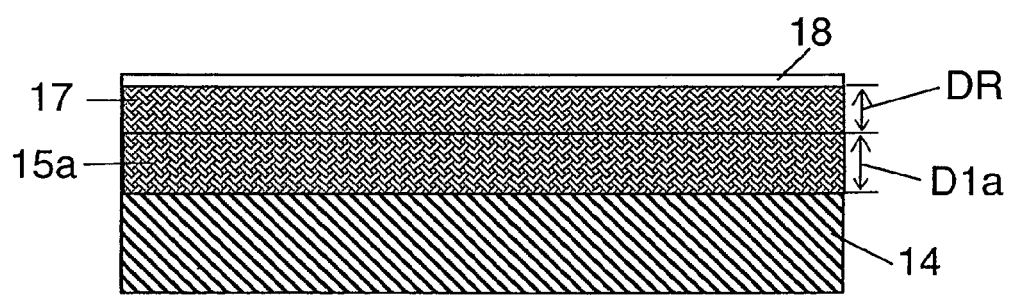
FIG. 2 a cross-sectional view of the fastening element shown in FIG. 1 according to marking II.

A fastening element 10 according to the present invention, which is shown in FIGS. 1-2 and is formed as a nail, has a shaft 11, a head 12 provided at one end of the shaft 11, and a pointed tip 13 provided at the shaft other end. The fastening element 10 has, as shown in FIG. 2, a core zone 14 formed of a carbon steel having a martensitic or bainitic structure and a hardness of which lies in a range between about 30 and 62 HRC. At least in one region of the shaft 11, radially outwardly, there is provided a skin zone 17 formed of a first less hardened, low-carbon steel alloyed with a first alloy metal. The skin zone 17 which has, perpendicular to the surface of the core zone 14, a thickness DR in a range from 0.001 mm to 1 mm, has an austenitic structure. As an alloy metal a metal, which is selected from a group containing Ni, Mn, Co, Al, Cr, V or MO, is used. Within the skin zone 17, the concentration of the alloy metal increases from inside out. The austenitic skin zone can be produced, e.g., by applying an alloy metal coating (e.g., with thickness of the coating layer from 0.001 to 1 mm) on the shaft 11 and a subsequent heat treatment. The skin zone has a hardness from 80 to 400 HV.

Between the core zone 14 and the skin zone 17, there is provided an intermediate zone 15a formed of a second low-carbon steel also having a smaller hardness. The intermediate zone 15a has also a hardness from 80 to 400 HV.

In the embodiment discussed above, the low-carbon steel of the intermediate zone 15a is also austenitic steel but which is alloyed with the second alloy metal which is not identical to the first alloy metal of the steel of the skin zone 17. The second alloy metal is also selected from the group consisting of Ni, Mn, Co, Al, Cr, V, and Mo. Within the first intermediate zone 15a, the concentration of the second alloy metal also increases from inside out. The first intermediate zone 15a which has, perpendicular to the surface of the core zone 14, a thickness D1a in a range from 0.01 mm to 1 mm, can be produced by coating the core zone 14 with the second alloy metal and by subsequent homogenizing. By coating the first intermediate zone 15a with the first alloy metal and by subsequent homogenizing the coating of the first alloy metal, the skin zone 17 can be produced which adjoins the first intermediate zone 15a outwardly thereof. Finally, the fastening element 10 is covered, preferably completely, with a corrosion protection layer 18 of one or more of the following metals Zn, Sn, Co, or Al that, e.g., can be applied to the surface of the skin zone, e.g., by galvanic deposition.

Figure 3:
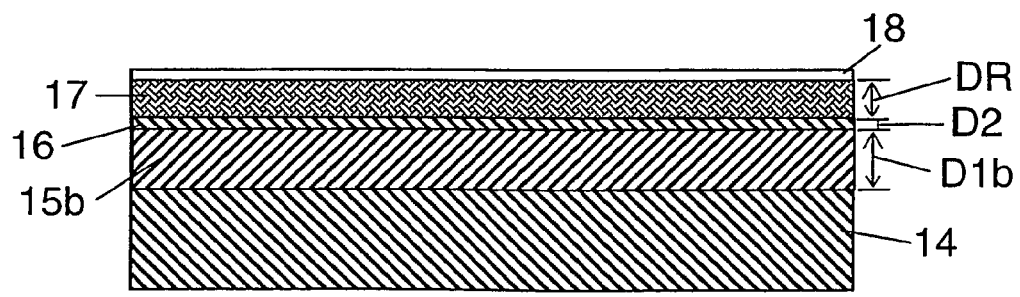
FIG. 3 a cross-sectional view similar to that of FIG. 2 of another embodiment of a fastening element according to the present invention.

The fastening element, a cross-section of which is shown in FIG. 3, distinguishes from that shown in FIGS. 1-2 in that between the core zone 14 (having a hardness from 30 to 62 HRC), which is formed of a carbon steel having a martensitic or bainitic structure and the skin zone 17 which is formed of a first low-carbon steel alloyed with a first alloy metal and having a reduced harness (from 80 to 400 HV), there are provided a first intermediate zone 15b which is formed of a ferritic steel (with a hardness from 50 to 250 Hv), and a second intermediate zone 16 which adjoins the first intermediate zone 15b outwardly thereof and is formed of a carbon steel (having a hardness from 30 to 62 HRS) and having a martensitic or bainitic structure. The first intermediate zone 15b has a thickness D1b between 0.01 mm and 0.2 mm, whereas the second intermediate zone 16, which is formed of a martensitic or bainitic carbon steel, has a thickness D2 between 0.002 mm and 0.3 mm.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A fastening element, comprising a core zone (14) formed of a relatively hard carbon steel; a skin zone (17) located outwardly of the core zone (14) and formed of a first low-carbon austenitic steel alloyed with a first alloy metal; and a first intermediate zone (15a, 15b) provided between the core zone (14) and the skin zone (17) and formed of a second low-carbon steel having a smaller hardness than the steel the core zone (14) is formed of.

2. A fastening element according to claim 1, wherein the second low carbon steel of the first intermediate zone (15a) is an austenitic steel alloyed with a second alloy metal.

3. A fastening element according to claim 1, wherein the second low-carbon steel of the first intermediate zone (15b) is a ferritic steel.

4. A fastening element according to claim 3, further comprising a second intermediate zone (16) provided between the first intermediate zone (15b) and the skin zone (17) and formed of a relatively hard carbon steel.

5. A fastening element according to claim 1, wherein the first intermediate zone (15a) has a thickness (D1a) transverse to a surface of the core zone (14) in a range between 0.001 mm and 1 mm.

6. A fastening element according to claim 4, wherein the first intermediate zone (15b) has a thickness (D1b) transverse to a surface of the core zone (14) in a range between 0.01 mm and 0.2 mm.

7. A fastening element according to claim 4, wherein the second intermediate zone (16) has a thickness (D2) transverse to a surface of the core zone (14) in a range between 0.002 mm and 0.3 mm.

8. A fastening element according to claim 1, wherein the first alloy metal of the steel of the skin zone (17) is a metal selected from the group containing Ni, Mn, Co, Al, Cr, V, and Mo.

9. A fastening element according to claim 2, wherein the second alloy metal of the steel of the first intermediate zone (15) is a metal selected from the group containing Ni, Mn, Co, Al, Cr, V, and Mo.

10. A fastening element according to claim 2, wherein a portion of the second alloy metal in the steel of the first intermediate zone (15a) gradually changes from outside in.

11. A fastening element according to claim 2, wherein a portion of the first alloy metal in the steel of the skin zone (17) gradually changes from outside in.

12. A fastening element according to claim 1, further comprising a coating of a corrosion protection layer (18).

* * * * *